(12) United States Patent
Niimi

(10) Patent No.: US 9,242,635 B2
(45) Date of Patent: Jan. 26, 2016

(54) VEHICLE HAVING A VENTILATION DEVICE FOR AN INTAKE PASSAGE OF AN INTERNAL COMBUSTION ENGINE

(75) Inventor: Kuniaki Niimi, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/128,014

(22) PCT Filed: Jun. 23, 2011

(86) PCT No.: PCT/JP2011/064437
§ 371 (c)(1),
(2), (4) Date: Dec. 20, 2013

(87) PCT Pub. No.: WO2012/176309
PCT Pub. Date: Dec. 27, 2012

(65) Prior Publication Data
US 2014/0129069 A1    May 8, 2014

(51) Int. Cl.
*B60W 20/00* (2006.01)
*F01P 7/08* (2006.01)
*B60K 6/445* (2007.10)
(Continued)

(52) U.S. Cl.
CPC ............... *B60W 20/00* (2013.01); *B60K 6/445* (2013.01); *B60K 6/485* (2013.01); *B60W 10/30* (2013.01); *F01N 3/32* (2013.01); *F01P 7/08* (2013.01); *F02B 29/0481* (2013.01); *F02B 29/0493* (2013.01); *F02D 17/04* (2013.01); *F02D 29/02* (2013.01); *F02D 41/042* (2013.01); *F02M 25/0728* (2013.01); *F02M 25/0742* (2013.01); *F02M 35/10209* (2013.01); *F02M 35/10268* (2013.01); *B60W 20/108* (2013.01); *B60W 2710/0688* (2013.01); *F02D 2200/0414* (2013.01); *Y02T 10/146* (2013.01); *Y02T 10/20* (2013.01); *Y02T 10/6239* (2013.01); *Y10S 903/902* (2013.01)

(58) Field of Classification Search
CPC ................. F02D 9/1055; F02M 53/08; F02M 35/10209; F02M 35/10268; F01P 2031/30; F01P 7/08; B60W 20/00; F02B 29/0481
USPC ........................................................ 701/22
See application file for complete search history.

(56) References Cited

U.S. PATENT DOCUMENTS 4,779,577 A * 10/1988 Ritter et al. ................. 123/41.05
5,493,858 A * 2/1996 Hosoya et al. ................. 60/289
(Continued)

FOREIGN PATENT DOCUMENTS

CN      102032027 A       4/2011
DE      3135878 A1 *      3/1983 ............. F02M 69/00
(Continued)

OTHER PUBLICATIONS

EPO machine translation of DE 3135878 A1 (original DE document published Mar. 24, 1983).*

*Primary Examiner* — Behrang Badii
*Assistant Examiner* — David Testardi
(74) *Attorney, Agent, or Firm* — Kenyon & Kenyon LLP

(57) ABSTRACT

ECU executes a program including a step of driving a fan when a vehicle is in an EV running and an intake air temperature Tair is higher than a threshold value T (0), and a step of stopping driving of the fan when the vehicle is not in the EV running or intake air temperature Tair is lower than or equal to Tair (0).

11 Claims, 6 Drawing Sheets

(51) Int. Cl.
*B60W 10/30* (2006.01)
*F01N 3/32* (2006.01)
*F02D 41/04* (2006.01)
*F02B 29/04* (2006.01)
*F02M 25/07* (2006.01)
*F02D 17/04* (2006.01)
*F02D 29/02* (2006.01)
*F02M 35/10* (2006.01)
*B60K 6/485* (2007.10)

(56) References Cited

U.S. PATENT DOCUMENTS

| | | | |
|---|---|---|---|
| 5,560,199 A * | 10/1996 | Agustin et al. | 60/274 |
| 5,666,804 A * | 9/1997 | Sekiya et al. | 60/284 |
| 5,675,968 A * | 10/1997 | Katashiba et al. | 60/276 |
| 5,826,671 A * | 10/1998 | Nakae et al. | 180/65.235 |
| 5,875,864 A | 3/1999 | Yano et al. | |
| 6,192,678 B1 * | 2/2001 | Tachibana | 60/289 |
| 6,358,109 B1 * | 3/2002 | Neisen | 440/89 R |
| 6,389,807 B1 | 5/2002 | Suzuki et al. | |
| 6,571,751 B2 * | 6/2003 | Vogt | 123/41.12 |
| 6,880,497 B1 * | 4/2005 | Avery et al. | 123/41.12 |
| 7,077,224 B2 * | 7/2006 | Tomatsuri et al. | 180/65.235 |
| 7,299,783 B1 * | 11/2007 | Broman et al. | 123/198 E |
| 2004/0069284 A1 * | 4/2004 | Corba | 123/563 |
| 2006/0201468 A1 | 9/2006 | Lancaster et al. | |
| 2010/0018189 A1 * | 1/2010 | Oi et al. | 60/290 |
| 2011/0072792 A1 | 3/2011 | Bidner et al. | |

FOREIGN PATENT DOCUMENTS

| | | | | |
|---|---|---|---|---|
| DE | 3135878 C2 * | 10/1993 | | |
| GB | 2038412 A * | 7/1980 | | F02D 37/00 |
| JP | 58053671 A * | 3/1983 | | |
| JP | 59180049 A * | 10/1984 | | F02D 39/00 |
| JP | 60079155 A * | 5/1985 | | F02M 53/00 |
| JP | H09-184459 A | 7/1997 | | |
| JP | 09-284916 A | 10/1997 | | |
| JP | 2000-161099 A | 6/2000 | | |
| JP | 2001-164970 A | 6/2001 | | |
| JP | 2003-307125 A | 10/2003 | | |
| JP | 2005351184 A * | 12/2005 | | F02B 29/04 |
| JP | 2007-038874 A | 2/2007 | | |
| JP | 2008-215303 A | 9/2008 | | |
| JP | 2010-223038 A | 10/2010 | | |

* cited by examiner

VEHICLE HAVING A VENTILATION DEVICE FOR AN INTAKE PASSAGE OF AN INTERNAL COMBUSTION ENGINE

CROSS-REFERENCE TO RELATED APPLICATIONS

This is a national phase application based on the PCT International Patent Application No. PCT/JP2011/064437 filed on Jun. 23, 2011, the entire contents of which are incorporated herein by reference.

TECHNICAL FIELD

The present invention relates to a control of a hybrid vehicle equipped with a rotating electrical machine for driving and an internal combustion engine.

BACKGROUND ART

Japanese Patent Laying-Open No. 09-284916 (PTD1) discloses a technology of stopping fuel supply to an internal combustion engine when a vehicle is in a decelerated state, and increasing an intake air amount of the internal combustion engine when regeneration is performed by a power generator.

CITATION LIST

Patent Document

PTD 1: Japanese Patent Laying-Open No. 09-284916

SUMMARY OF INVENTION

Technical Problem

When a vehicle runs with use of a rotating electrical machine for driving in a state where rotation of an internal combustion engine is stopped, an intake air amount cannot be increased. Therefore, there is a problem that temperature of air in an intake passage is raised by heat of the internal combustion engine. The rise in temperature of air in the intake passage reduces a density of air in the intake passage. Therefore, in some cases, heat efficiency is lowered after the internal combustion engine is started.

An object of the present invention is to provide a vehicle suppressing lowering in the heat efficiency when an internal combustion engine is started after an EV running.

Solution to Problem

A vehicle according to one aspect of the present invention includes a rotating electrical machine for driving equipped in the vehicle, an internal combustion engine, and a controller for controlling the vehicle to perform a ventilation operation of ventilating air in an intake passage when the vehicle runs with use of the rotating electrical machine for driving, and the vehicle is predicted to have a high temperature in the intake passage of the internal combustion engine even though the internal combustion engine is in a stopped state.

Preferably, the vehicle includes a ventilation device for performing the ventilation operation. The ventilation device includes a communication passage having one end connected to the intake passage.

More preferably, the one end of the communication passage is connected to a more downstream position on the intake passage than a throttle valve of the internal combustion engine.

More preferably, other end of the communication passage is connected to an exhaust passage without intervention of a cylinder of the internal combustion engine.

More preferably, the other end of the communication passage is connected to a more upstream position on the exhaust passage then a catalyst provided on the exhaust passage.

More preferably, the other end of the communication passage is connected to a more downstream position on the exhaust passage than a catalyst provided on the exhaust passage.

More preferably, other end of the communication passage is configured to be open into an engine room of the vehicle.

More preferably, the ventilation device further includes a fan for allowing air to flow from the intake passage to the communication passage.

More preferably, the vehicle further includes a detector for detecting the temperature in the intake passage. The controller drives the fan when the temperature in the intake passage detected by the detector is higher than a threshold value.

More preferably, the ventilation device is provided in an exhaust re-circulating device.

Advantageous Effects of Invention

According to the present invention, when the vehicle is in the EV running, and the temperature in the intake passage is higher than the threshold value, the air in the intake passage can be ventilated with use of the ventilation device. Therefore, rise in temperature of the air in the intake passage due to heat of the internal combustion engine before starting the internal combustion engine in the EV running can be suppressed. Thus, a vehicle suppressing lowering in the heat efficiency when starting the internal combustion engine after the EV running can be provided.

DESCRIPTION OF EMBODIMENTS

Figure 1:
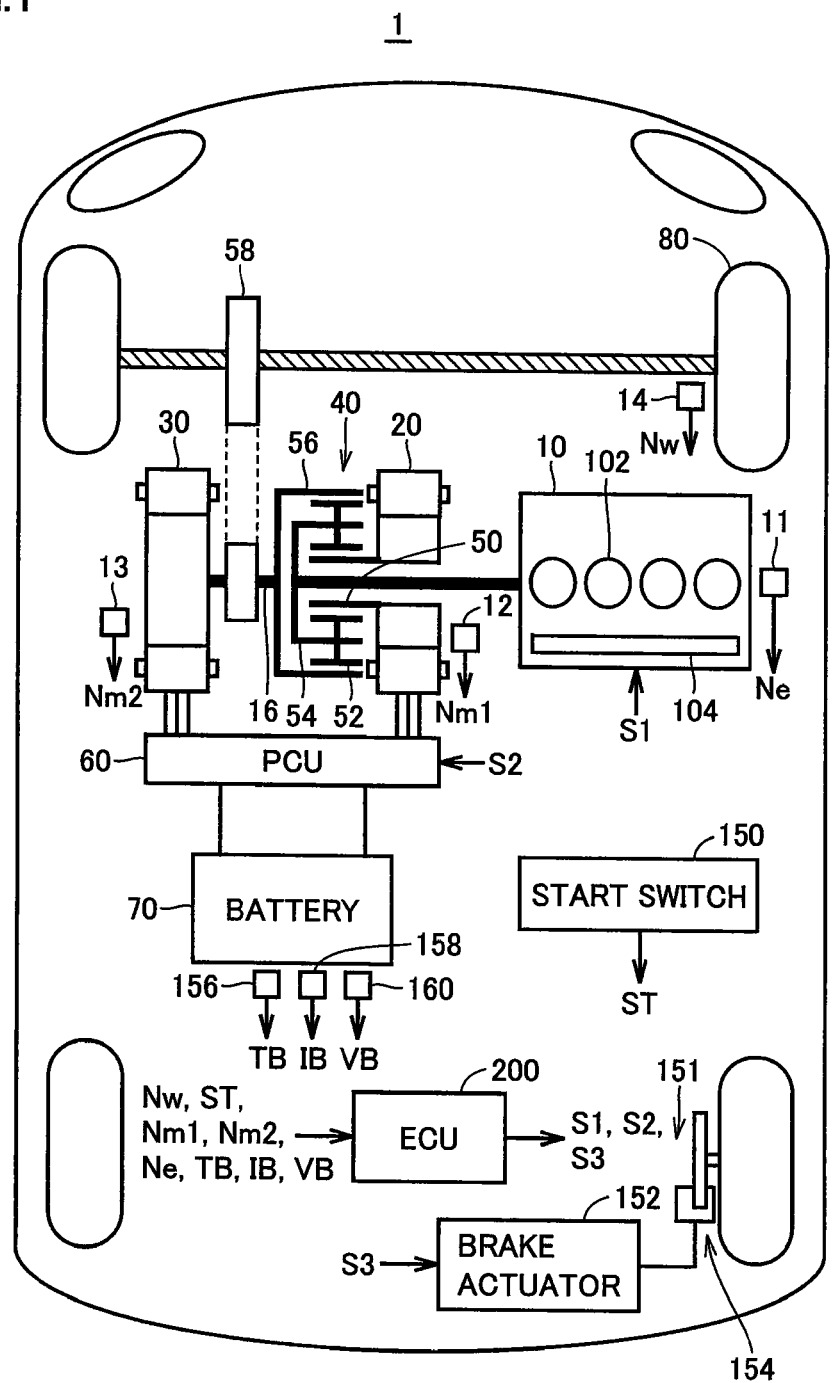
FIG. 1 represents an overall block diagram of a vehicle according to a first embodiment.

Hereinafter, embodiments of the present invention will be described with reference to the drawings. In the following description, the same parts have the same reference numerals allotted. Names and functions of those are the same. Therefore, detailed description thereof will not be repeated.

<First Embodiment>

Referring to FIG. 1, an overall block diagram of a vehicle 1 according to the present embodiment will be described. Vehicle 1 includes an engine 10, a drive shaft 16, a first motor generator (hereinafter, referred to as "first MG") 20, a second motor generator (hereinafter, referred to as "second MG") 30, a power split device 40, a reducer 58, a PCU (Power Control Unit) 60, a battery 70, drive wheels 80, a start switch 150, a braking device 151, and an ECU (Electronic Control Unit) 200.

This vehicle 1 runs with use of driving power provided by at least one of engine 10 and second MG 30. Motive power generated by engine 10 is split into two paths by power split device 40. One path of the two paths is a path for transmission to drive wheels 80 through reducer 58, and the other path is a path for transmission to first MG 20.

First MG 20 and second MG 30 are, for example, three-phase alternating current rotating electric machines. First MG 20 and second MG 30 are driven by PCU 60.

First MG 20 has a function of a generator for generating power with use of motive power of engine 10 split by power split device 40 to charge battery 70 through PCU 60. Further, first MG 20 receives electric power from battery 70 and rotates a crank shaft as an output shaft of engine 10. Therefore, first MG 20 has a function of a starter for starting engine 10.

Second MG 30 has a function of a driving motor for providing driving power to drive wheels 80 with use of at least either one of the electric power stored in battery 70 and the electric power generated by first MG 20. Further, second MG 30 has a function of a generator for charging battery 70 through PCU 60 with use of electric power generated by regenerative braking.

Engine 10 is, for example, an internal combustion engine such as a gasoline engine, a diesel engine, or the like. Engine 10 includes a plurality of cylinders 102, and a fuel injection device 104 for supplying fuel to each of the plurality of cylinders 102. Fuel injection device 104 injects an appropriate amount of fuel to each cylinder at an appropriate timing and stops injection of fuel to each cylinder in accordance with a control signal S1 from ECU 200.

Figure 2:
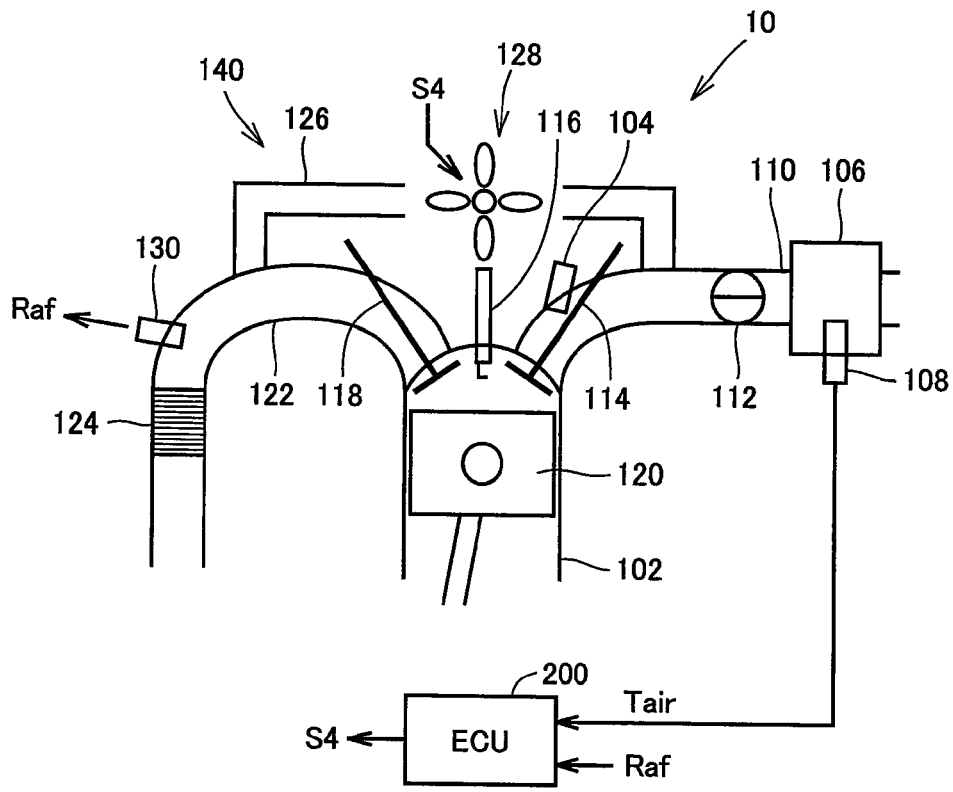
FIG. 2 represents a configuration of a ventilation device equipped in the vehicle according to the first embodiment.

As shown in FIG. 2, engine 10 includes an air cleaner 106, an intake passage 110, a throttle valve 112, an intake valve 114, an ignition plug 116, an exhaust valve 118, a piston 120, an exhaust passage 122, a catalyst 124, and a ventilation device 140.

Air cleaner 106 is provided with an intake air temperature sensor 108. Intake air temperature sensor 108 detects a temperature of air taken through air cleaner 106 (hereinafter, referred to as "intake air temperature Tair"). Intake air temperature sensor 108 transmits a signal indicating detected intake air temperature Tair to ECU 200. Intake air temperature sensor 108 may be provided in an air flow meter not illustrated in the drawings, or may be provided independently of the air flow meter on intake passage 110. Further, intake air temperature sensor 108 may be provided on intake passage 110, and is not limited to be provided in air cleaner 106 as shown in FIG. 2. For example, intake air temperature sensor 108 may be provided at a position closer to the side of cylinder 102 than to throttle valve 112 on intake passage 110, or may be provided at a position in an engine block immediately anterior to cylinder 102 on intake passage 110.

One end of intake passage 110 is connected to air cleaner 106. The other end of intake passage 110 is connected to cylinder 102. On intake passage 110, throttle valve 112 is provided. Throttle valve 112 is provided with a throttle motor not illustrated in the drawings. An opening degree of throttle valve 112 is adjusted by driving of the throttle motor in accordance with a control signal from ECU 200.

At a position between throttle valve 112 and the other end of intake passage 110 on intake passage 110, fuel injection device 104 is provided. Fuel injection device 104 may be provided in cylinder 102.

At a connection portion between intake passage 110 and cylinder 102, intake valve 114 is provided. Intake valve 114 is operated in conjunction with rotation of a camshaft (not illustrated) provided on the side of intake valve 114. The camshaft provided on the side of intake valve 114 is operated in conjunction with rotation of the crank shaft of engine 10. Intake valve 114 provides a communication state of allowing gas flow between intake passage 110 and cylinder 102, and a blocking state of blocking gas flow between intake passage 110 and cylinder 102, in accordance with rotation of engine 10.

One end of exhaust passage 122 and the other end of intake passage 110 are connected respectively to cylinder 102. On the top of cylinder 102, ignition plug 116 is provided. Ignition plug 116 performs ignition at a timing in accordance with a control signal from ECU 200.

Piston 120 is accommodated in cylinder 102. Piston 120 is connected with a crank shaft through a connecting rod. Vertical movement of piston 120 generated by combustion in cylinder 102 is converted to rotational movement of the crank shaft by the connecting rod and the crank shaft.

At the connection portion between cylinder 102 and the one end of exhaust passage 122, exhaust valve 118 is provided. Exhaust valve 118 is operated in conjunction with rotation of a camshaft (not illustrated) provided on the side of exhaust valve 118, in other words, rotation of the crank shaft of engine 10. Exhaust valve 118 provides a communication state of allowing gas flow between cylinder 102 and exhaust passage 122, and a blocking state of blocking gas flow between cylinder 102 and exhaust passage 122, in accordance with rotation of engine 10. The other end of exhaust passage 122 is coupled to a muffler (not illustrated).

On exhaust passage 122, a catalyst 124 for purifying exhaust gas is provided. Between catalyst 124 and the one end of exhaust passage 122, an air-fuel ratio sensor 130 is provided.

Air-fuel ratio sensor 130 detects an air-fuel ratio Raf of exhaust gas flowing between catalyst 124 and the one end of exhaust passage 122. Air-fuel ratio sensor 130 transmits a signal indicating detected air-fuel ratio Raf to ECU 200.

Ventilation device 140 includes a communication passage 126 and a fan 128. Communication passage 126 directly connects intake passage 110 and exhaust passage 122 without intervention of cylinder 102. Fan 128 is an electric fan driven in accordance with a control signal S4 from ECU 200. When fan 128 is driven, air in communication passage 126 flows from the side of intake passage 110 to the side of exhaust passage 122. As a result, air present in intake passage 110 is introduced into communication passage 126.

Between communication passage 126 and intake passage 110, there may be provided a check valve blocking gas flow from the side of communication passage 126 to the side of intake passage 110 and allowing gas flow from the side of intake passage 110 to the side of communication passage 126. In this manner, reverse flow of gas from communication passage 126 to intake passage 110 is suppressed.

One end of communication passage 126 is connected to a position between throttle valve 112 and fuel injection device 104 on intake passage 110. In the present embodiment, the other end of communication passage 126 is connected to a position between the one end of exhaust passage 122 and catalyst 124 on exhaust passage 122.

Referring back to FIG. 1, engine 10 is provided with an engine rotational speed sensor 11 for detecting a rotational speed (hereinafter, referred to as "engine rotational speed") Ne of the crank shaft of engine 10. Engine rotational speed sensor 11 transmits a signal indicating detected engine rotational speed Ne to ECU 200.

Power split device 40 mechanically couples each of three elements including a drive shaft 16 for rotating drive wheels 80, an output shaft of engine 10, and a rotational shaft of first MG 20. Power split device 40 regards any one of the three elements described above as a reactive force element to allow transmission of motive power between the other two elements. The rotational shaft of second MG 30 is coupled to drive shaft 16.

Power split device 40 is a planetary gear mechanism including a sun gear 50, a pinion gear 52, a carrier 54, and a ring gear 56. Pinion gear 52 is in mesh with each of sun gear 50 and ring gear 56. Carrier 54 supports pinion gear 52 rotatably and is coupled to the crank shaft of engine 10. Sun gear 50 is coupled to the rotational shaft of first MG 20. Ring gear 56 is coupled to the rotational shaft of second MG 30 and reducer 58 through drive shaft 16.

Reducer 58 transmits motive power from power split device 40 and second MG 30 to drive wheels 80. Further, reducer 58 transmits a reactive force received at drive wheels 80 from a road surface to power split device 40 and second MG 30.

PCU 60 converts direct current power stored in battery 70 into alternate current power for driving first MG 20 and second MG 30. PCU 60 includes a converter and an inverter (neither illustrated) controlled in accordance with a control signal S2 from ECU 200. The converter boosts a voltage of the direct current power received from battery 70 and outputs the voltage to the inverter. The inverter converts the direct current power outputted by the converter into the alternate current power and outputs the alternate current power to first MG 20 and/or second MG 30. Accordingly, first MG 20 and/or second MG 30 is/are driven with use of the electric power stored in battery 70. Further, the inverter converts the alternate current power generated by first MG 20 and/or second MG 30 into the direct current power and outputs the direct current power to the converter. The converter steps down the voltage of the direct current power provided by the inverter and outputs the voltage to battery 70. Accordingly, battery 70 is charged with use of the electric power generated by first MG 20 and/or second MG 30. The converter may be omitted.

Battery 70 is a power storage device, and is a rechargeable direct current power supply. As battery 70, a secondary battery such as nickel-metal hydride or lithium-ion battery is used. The voltage of battery 70 is about 200V. Battery 70 may be charged with use of the electric power supplied from an external power supply (not illustrated), other than being charged with use of the electric power generated by first MG 20 and/or second MG 30 as described above. Further, battery 70 is not limited to a secondary battery, and may be, for example, a capacitor, a solar cell, a fuel cell, and the like capable of generating a direct current voltage.

Battery 70 is provided with a battery temperature sensor 156 for detecting a battery temperature TB of battery 70, a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push-type switch. Start switch 150 may be of a type having a key inserted into a key cylinder and rotated to a predetermined position. Start switch 150 is connected to ECU 200. In response to operation of start switch 150 by a driver, start switch 150 transmits a signal ST to ECU 200.

For example, when ECU 200 receives signal ST in the case where the system of vehicle 1 is in a stopped state, ECU 200 determines that an activation instruction is received, and then allows the system of vehicle 1 to be shifted from the stopped state to an activated state. Further, when ECU 200 receives signal ST in the case where the system of vehicle 1 is in the activated state, ECU 200 determines that a stopping instruction is received, and then allows the system of vehicle 1 to be shifted from the activated state to the stopped state. In the following description, the operation of start switch 150 by a driver in the case where the system of vehicle 1 is in the activates state is referred to as an IG OFF operation, and the operation of start switch 150 by the driver in the case where the system of vehicle 1 is in the stopped state is referred to as an IG ON operation. Further, when the system of vehicle 1 is shifted to the activated state, electric power is supplied to a plurality of equipment necessary for running of vehicle 1 to attain an operable state. On the other hand, when the system of vehicle 1 is shifted to the stopped state, supply of electric power to some of the plurality of equipments necessary for running of vehicle 1 is stopped to attain an operation-stopped state.

A first resolver 12 is provided in first MG 20. First resolver 12 detects a rotational speed Nm1 of first MG 20. First resolver 12 transmits a signal indicating detected rotational speed Nm1 to ECU 200. A second resolver 13 is provided in second MG 30. Second resolver 13 detects a rotational speed Nm2 of second MG 30. Second resolver 13 transmits a signal indicating detected rotational speed Nm2 to ECU 200.

A wheel speed sensor 14 detects a rotational speed Nw of drive wheels 80. Wheel speed sensor 14 transmits a signal indicating detected rotational speed Nw to ECU 200. ECU 200 calculates a vehicle speed V in accordance with received rotational speed Nw. ECU 200 may calculate vehicle speed V in accordance with rotational speed Nm2 of second MG 30 in place of rotational speed Nw.

Braking device 151 includes a brake actuator 152 and a disc brake 154. Disc brake 154 includes a brake disc rotating with wheels in an integrated fashion, and a brake caliper for limiting rotation of the brake disc with use of a hydraulic pressure. The brake caliper includes a brake pad provided so as to sandwich the brake disc in the direction parallel to the rotational shaft, and a wheel cylinder for transmitting a hydraulic pressure to the brake pad. Brake actuator 152 adjusts a hydraulic pressure generated by the driver's pushing operation with respect to a brake pedal and a hydraulic pressure generated with use of a pump, an electromagnetic valve, and the like in accordance with a control signal S3 received from ECU 200 to adjust a hydraulic pressure supplied to the wheel cylinder. In FIG. 1, braking device 151 is illustrated only on the right rear wheel. However, braking device 151 is provided on each wheel.

ECU 200 generates control signal Si for controlling engine 10, and outputs generated control signal S1 to engine 10. Further, ECU 200 generates control signal S2 for controlling PCU 60, and outputs generated control signal S2 to PCU 60.

Further, ECU 200 generates control signal S3 for controlling brake actuator 152, and outputs generated control signal S3 to brake actuator 152.

ECU 200 controls engine 10, PCU 60, and the like to control a whole hybrid system, in other words, charging/discharging states of battery 70, operation states of engine 10, first MG 20 and second MG 30 so that vehicle 1 can be operated in the most efficient manner.

ECU 200 calculates required driving power corresponding to a stepping amount with respect to an accelerator pedal (not illustrated) provided at a driver's seat. ECU 200 controls torque of first MG 20 and second MG 30 and an output of engine 10 in accordance with calculated required driving power.

In vehicle 1 having such a configuration described above, when an efficiency of engine 10 is poor at the time of starting or during low-speed running, running with use of only second MG 30 is performed. For example, when a predetermined stopping condition of engine 10 is met, ECU 200 allows vehicle 1 to run with use of second MG 30 in the state where engine 10 is stopped. The predetermined stopping condition is a condition as to a state of vehicle 1, and may include, for example, the condition that vehicle 1 starts running, the condition that vehicle 1 is in the low-speed running, the condition that the operation region of engine 10 is in the predetermined region causing deteriorated fuel consumption, and the like.

Further, when the running with use of only second MG 30 of vehicle 1 is performed, and the predetermined starting condition of engine 10 is met, ECU 200 starts engine 10. The predetermined starting condition is a condition as to the state of vehicle 1, and may include, for example, the condition that the SOC of battery 70 is lower than a predetermined value (>lower limit value), the condition that the operation region of engine 10 is in a predetermined region providing good fuel consumption characteristics at the time of starting engine 10, and the like.

Further, during the normal running, power split device 40 splits the motive power of engine 10 into two paths. One motive power directly drives drive wheels 80. The other motive power drives first MG 20 to generate electric power. In this stage, ECU 200 uses the generated electric power to drive second MG 30. Driving second MG 30 in this manner supports driving of drive wheels 80.

During deceleration of vehicle 1, second MG 30 driven by rotation of drive wheels 80 serves as a generator to perform regenerative braking. The electric power collected by the regenerative braking is stored in battery 70. When charging is particularly required due to low state of charge of the power storage device (in the following, referred to as SOC (State of Charge)), ECU 200 increases output of engine 10 to increase the amount of electric power generated by first MG 20. Accordingly, the SOC of battery 70 increases. Further, in some cases, ECU 200 performs a control of increasing driving power from engine 10 as needed even during the low-speed running. For example, the cases may include the case where charging of battery 70 is required as described above, the case where an auxiliary machine such as an air conditioner or the like is driven, the case where the temperature of coolant water of engine 10 is raised up to a predetermined temperature, and the like.

When controlling the amount of charge and the amount of discharge of battery 70, ECU 200 sets allowable input electric power for charging of battery 70 (in the following description, referred to as "charging power upper limit Win") and allowable output electric power allowed during discharging of battery 70 (in the following description, referred to as "discharging power upper limit Wout") in accordance with battery temperature TB and current SOC. For example, when current SOC is lowered, discharging power upper limit Wout is set to be lower gradually. On the other hand, when current SOC becomes high, charging power upper limit Win is set to be lower gradually.

The secondary battery used as battery 70 has temperature dependency that internal resistance rises when the temperature is low. Further, when the temperature is high, it is necessary to prevent excessive rise in the temperature due to further heat generation. Therefore, when battery temperature TB is low and high, it is preferable to lower each of discharging power upper limit Wout and charging power upper limit Win. ECU 200 sets charging power upper limit Win and discharging power upper limit Wout with use of a map and the like in accordance with battery temperature TB and current SOC.

The present embodiment is characterized in that, when vehicle 1 runs with use of second MG 30 (hereinafter, referred to as "EV running"), and vehicle 1 is predicted to have a high temperature in intake passage 110 of engine 10 even though engine 10 is in the stopped state, ECU 200 controls vehicle 1 to perform a ventilation operation of ventilating air in intake passage 110. The expression "engine 10 is in the stopped state" indicates the state where rotation of engine 10 is stopped (more specifically, the state where the rotation of the crank shaft of engine 10 is stopped).

Specifically, the present embodiment is characterized in that, when vehicle 1 is in the EV running, and intake air temperature Tair is higher than a threshold value Tair(0), ECU 200 controls fan 128 so as to ventilate air in intake passage 110.

Figure 3:
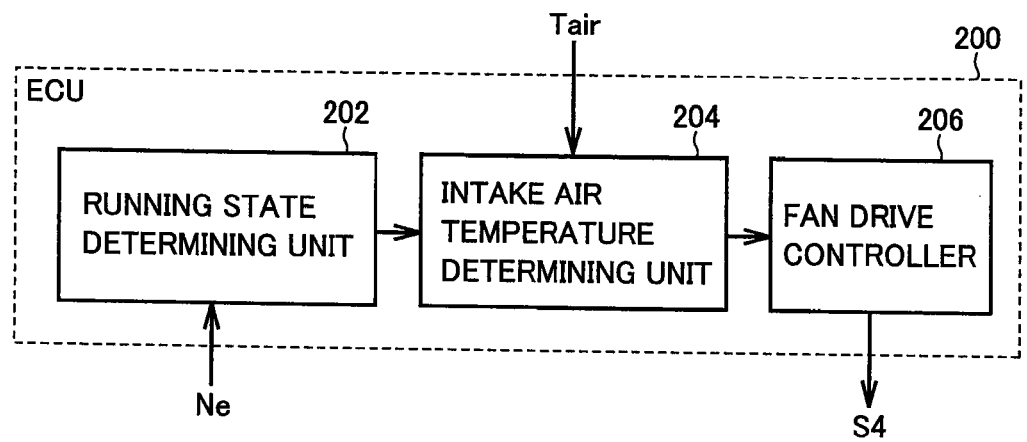
FIG. 3 represents a functional block diagram of an ECU equipped in the vehicle according to the first embodiment.

FIG. 3 represents a functional block diagram of ECU 200 equipped in vehicle 1 in accordance with the present embodiment. ECU 200 includes a running state determining unit 202, an intake air temperature determining unit 204, and a fan drive controller 206.

Running state determining unit 202 determines whether or not vehicle 1 is in the EV running. For example, when engine rotation number Ne is substantially zero, and driving power in the forward direction is required for vehicle 1 (or second MG 30), running state determining unit 202 may determine that vehicle 1 is in the EV running.

Alternatively, when speed V of vehicle 1 is higher than or equal to a threshold value for determining running of vehicle 1, and engine rotation number Ne is substantially zero, running state determining unit 202 may determine that vehicle 1 is in the EV running. Running state determining unit 202 may determine that vehicle 1 is in the EV running when the driving power in the forward direction required for vehicle 1 is lower than or equal to the driving power which can be outputted with use of second MG 30.

Running state determining unit 202 may turn on an EV running determination flag when it determines that vehicle 1 is in the EV running. Further, running state determining unit 202 performs determination on whether or not vehicle 1 is in the EV running from starting to stopping of the system of vehicle 1.

Intake air temperature determining unit 204 determines whether or not intake air temperature Tair is higher than threshold value Tair(0). Threshold value Tair(0) is, for example, a predetermined value. For example, an upper limit value of a value not causing lowering in heat efficiency in the case of starting engine 10 is set as threshold value Tair(0).

For example, intake air temperature determining unit 204 may turn on an intake air temperature determination flag when intake air temperature Tair is determined to be higher than threshold value Tair(0).

Fan drive controller 206 drives fan 128 when running state determining unit 202 determines that vehicle 1 is in the EV running, and intake air temperature determining unit 204 determines that intake air temperature Tair is higher than threshold value Tair (0). The driving amount of fan 128 may be a maximum driving amount, a driving amount with a noise level at which driving is not sensed by a passenger of vehicle 1, or a driving amount necessary for lowering intake air temperature Tair, and it is not particularly limited. Preferably, the opening degree of throttle valve 112 is increased with driving of fan 128. For example, the opening degree of throttle valve 112 may be increased to the opening degree corresponding to a fully opened state.

When fan 128 is driven in the case where vehicle 1 is not in the EV running, or driven in the case where intake air temperature Tair is less than or equal to threshold value Tair(0), fan drive controller 206 stops driving of fan 128.

Fan drive controller 206 may generate control signal S4 and transmit generated control signal S4 to fan 128 to drive fan 128 when both the EV running determination flag and the intake air temperature determination flag are in the ON state.

Further, for example, fan drive controller 206 may stop driving of fan 128 by stopping transmission of control signal S4 or by any other way when either one of the EV running determination flag and the intake air temperature determination flag is in the OFF state.

In the present embodiment, running state determining unit 202, intake air temperature determining unit 204, and fan drive controller 206 are described as functions of software achieved by the CPU of ECU 200 executing a program stored in a memory, but may be achieved by hardware. Such a program is stored in a storage medium and equipped in the vehicle.

Figure 4:
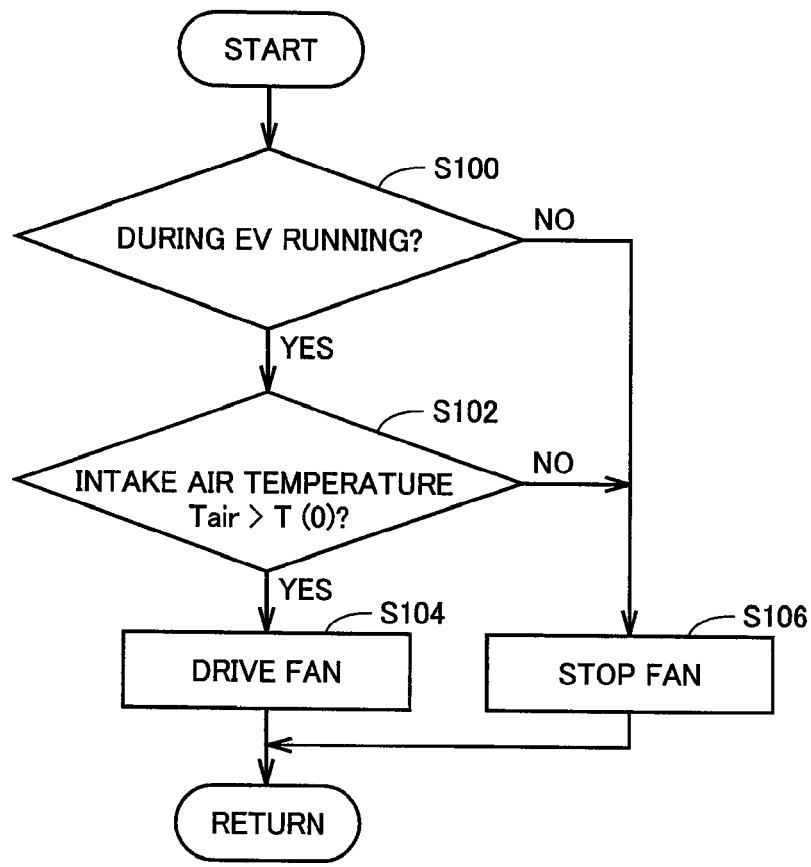
FIG. 4 represents a flowchart showing a control structure of a program executed by the ECU equipped in the vehicle according to the first embodiment.

Referring to FIG. 4, a control structure of the program executed by ECU 200 equipped in vehicle 1 according to the present embodiment will be described.

In Step (hereinafter, "Step" will be described as "S") 100, ECU 200 determines whether or not vehicle 1 is in the EV running. When vehicle 1 is in the EV running (YES in S100), the process proceeds to S102. If not so (NO in S100), the process proceeds to S106.

In S102, ECU 200 determines whether or not intake air temperature Tair is higher than Tair(0). When intake air temperature Tair is higher than Tair(0) (YES in S102), the process proceeds to S104. If not so (NO in S102), the process proceeds to S106.

In S104, ECU 200 drives fan 128. In S106, ECU 200 stops driving of fan 128.

Figure 5:
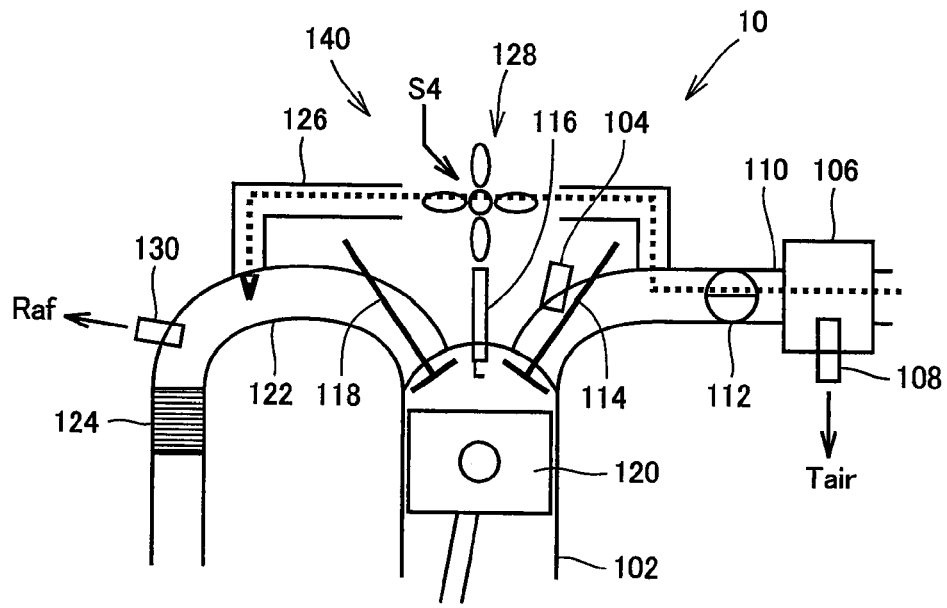
FIG. 5 represents operation of the ventilation device equipped in the vehicle according to the first embodiment.

Referring to FIG. 5, operation of ECU 200 equipped in vehicle 1 according to the present embodiment based on the structure and the flowchart described above will be described.

For example, it is assumed that vehicle 1 is running in the state where engine 10 is operated. ECU 200 stops engine 10 when the predetermined stopping condition for engine 10 is met. Therefore, vehicle 1 runs with use of second MG 30 in the state where engine 10 is stopped (YES in S100).

In this stage, when intake air temperature Tair is higher than threshold value Tair(0) (YES in S102), fan 128 is driven (S104).

Driving of fan 128 causes air to flow as indicated by the arrow of the broken line in FIG. 5. In other words, the air resided in intake passage 110 flows to a position on a more upstream side than catalyst 124 on exhaust passage 122 through communication passage 126. The air flew from communication passage 126 to exhaust passage 122 flows into the side of the muffler through catalyst 124. Further, since driving of fan 128 causes the pressure in intake passage 110 to be low, air is introduced into intake passage 110 through air cleaner 106. Since driving of fan 128 maintains the state where air in intake passage 110 is ventilated, rise in the temperature of air in intake passage 110 due to heat of engine 10 is suppressed.

When the predetermined starting condition of engine 10 is met during the EV running (NO in S100), or when intake air temperature Tair is lower than or equal to threshold value Tair(0) (NO in S102), ECU 200 stops driving of fan 128 (S106).

In the manner described above, according to the vehicle of the present embodiment, when vehicle 1 is in the EV running, and intake air temperature Tair is higher than threshold value Tair(0), driving of fan 128 can ventilate the air in intake passage 110. Consequently, rise in the temperature of air in intake passage 110 due to heat of engine 10 during the EV running can be suppressed. Therefore, a vehicle suppressing lowering in heat efficiency at the time of starting an engine after the EV running can be provided.

In the present embodiment, it was described that threshold value Tair(0) of intake air temperature Tair is a predetermined value, but it is not limited to a certain value. Threshold value Tair(0) may be a value changed in accordance with an elapse of time after stopping engine 10, for example. ECU 200 may set threshold value Tair(0) so that threshold value Tair(0) becomes smaller as an elapse of time after stopping engine 10 becomes shorter. Alternatively, ECU 200 may set threshold value Tair(0) so that threshold value Tair(0) becomes smaller as an elapse of time after stopping engine 10 becomes longer.

Alternatively, ECU 200 may predict, for example, maximum value Tmax of the temperature of the air in intake passage 110 based on intake air temperature Tair at intake air temperature sensor 108 to determine whether or not maximum value Tmax of the predicted temperature in the air in intake passage 110 is higher than threshold value Tair(0).

In FIG. 1, the example was illustrated where drive wheels 80 are front wheels of vehicle 1. However, the driving system is not limited to such type. For example, vehicle 1 may have rear wheels as drive wheels. Alternatively, vehicle 1 may be a vehicle having second MG 30 of FIG. 1 being omitted. Further, vehicle 1 may be a vehicle having second MG 30 of FIG. 1 being coupled to a drive shaft for driving the rear wheels in place of being coupled to drive shaft 16 of the front wheels. Further, a transmission mechanism may be provided between drive shaft 16 and reducer 58 or between drive shaft 16 and second MG 30.

Figure 6:
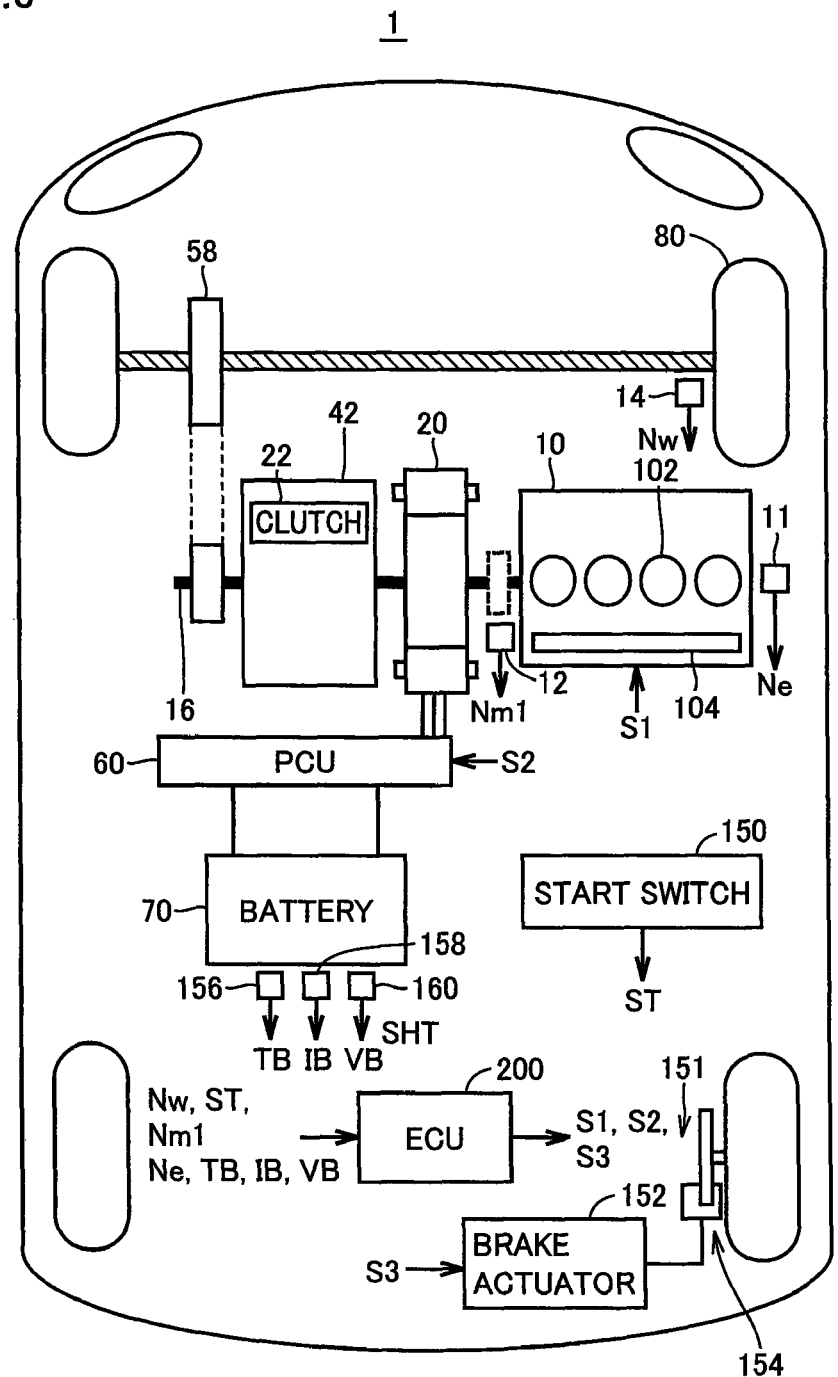
FIG. 6 represents another example of a configuration of a vehicle.

Alternatively, vehicle 1 may have a configuration as illustrated in FIG. 6. Specifically, vehicle 1 shown in FIG. 6 is different from the configuration of vehicle 1 of FIG. 1 in having no second MG 30, having a rotational shaft of first MG 20 coupled to an output shaft of engine 10, and including in place of power split device 40 a motive power transmission device 42 having a clutch 22. Clutch 22 changes the states of first MG 20 and drive wheels 80 between a motive power transmitting state and a motive power blocking state. Motive power transmission device 42 is, for example, a transmission mechanism. In addition to clutch 22, another clutch (broken line in FIG. 6) may be further provided between engine 10 and first MG 20.

In the present embodiment, the case where intake air temperature Tair is higher than threshold value Tair(0) is illustrated as an example of "the state where vehicle 1 has a high temperature in intake passage 110 of engine 10." However, the present invention is not particularly limited to this example. For example, "the state where vehicle 1 has a high temperature in intake passage 110 of engine 10" may include a predetermined time period after stopping engine 10.

In other words, within a predetermined time period after stopping engine 10 in the case where vehicle 1 is in the EV running, ECU 200 may perform the ventilation operation.

The predetermined time period after stopping engine 10 may be the period from immediately after stopping engine 10 to an elapse of a predetermined time period. Alternatively, the predetermined period after stopping engine 10 may be a period from a first time point after stopping engine 10 to a second time point posterior to the first time point. The predetermined time period after stopping engine 10 may be adopted by experiments and the like so as to include the period in which heat of engine 10 after stopping causes the temperature of the air in intake passage 110 to be higher than threshold value Tair(0).

Further, the predetermined period after stopping engine 10 may be changed by operation time of engine 10. For example, ECU 200 may set the predetermined time period to be longer as operation time of engine becomes longer.

Further, in the present embodiment, ventilation device 140 for performing the ventilation operation is illustrated as including fan 128. However, communication passage 126 and a valve for opening and closing communication passage 126 may be included without fan 128.

Further, although it is illustrated that the ventilation operation is performed by fan 128 in the present embodiment, the ventilation operation is not limited to be performed by fan 128.

For example, when vehicle 1 is in the EV running, ECU 200 may increase the opening degree of throttle valve 112 of engine 10 in the state where vehicle 1 is predicted to have a high temperature in intake passage 110 of engine 10. ECU 200 may increase the opening degree of throttle valve 112 to the opening degree corresponding to full-open. In this case, fan 128 may be omitted. In such a manner, flow of the running wind from intake passage 110 to communication passage 126 achieves the ventilation operation.

<Second Embodiment>

In the following, a vehicle according to the second embodiment will be described. Vehicle 1 according to the present embodiment is different from the configuration of vehicle 1 according to the above-described first embodiment in that an exhaust re-circulating device 142 is included in place of ventilation device 140. Other configuration is the same as the configuration of vehicle 1 according to the above-described first embodiment. These configurations have the same reference numerals allotted. Functions of those are also the same. Therefore, detailed description thereof will not be repeated.

Figure 7:
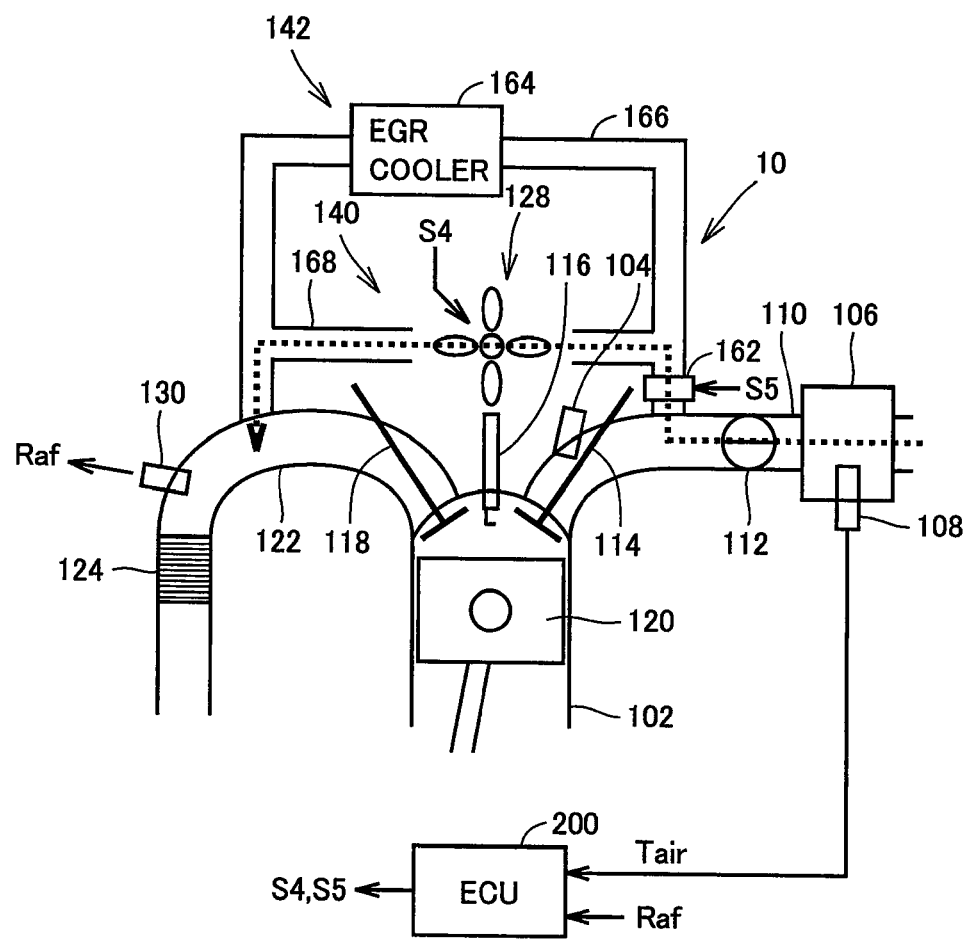
FIG. 7 represents a configuration of a ventilation device equipped in a vehicle according to a second embodiment.

As shown in FIG. 7, vehicle 1 according to the present embodiment includes exhaust re-circulating device 142. Exhaust re-circulating device 142 includes an EGR valve 162, an EGR cooler 164, an EGR piping 166, a communication passage 168, and fan 128.

EGR piping 166 provides a bypass between intake passage 110 and exhaust passage 122. In other words, EGR piping 166 directly connects intake passage 110 and exhaust passage 122 without intervention of cylinder 102.

EGR valve 162 is provided at a position closer to the side of intake passage 110 than EGR cooler 164 in EGR piping 166. EGR valve 162 is opened or closed to have an opening degree corresponding to control signal S5 from ECU 200. ECU 200 generates control signal S5 for adjusting the opening degree of EGR valve 162 in accordance with the state of engine 10 and transmits generated control signal S5 to EGR valve 162.

EGR cooler 164 is a heat exchanger provided on EGR piping 166. EGR cooler 164 lowers the temperature of exhaust gas circulated from exhaust passage 122. EGR cooler 164 may be omitted.

Communication passage 168 is connected to EGR piping 166 so as to provide a bypass for EGR cooler 164. Specifically, one end of communication passage 168 is connected to a position between EGR valve 162 and EGR cooler 164 on EGR piping 166. Further, the other end of communication passage 168 is connected to a position between EGR cooler 164 and a connection portion of EGR piping 166 and exhaust passage 122. On communication passage 168, fan 128 is provided.

In such a configuration, the present embodiment is characterized in that, when vehicle 1 is in the EV running, and intake air temperature Tair is higher than threshold value Tair(0), ECU 200 opens EGR valve 162 and controls fan 128 of exhaust re-circulating device 142 to ventilate air in intake passage 110.

The functional block diagram of ECU 200 provided in vehicle 1 according to the present embodiment has the configuration same as the functional block diagram of ECU 200 in the first embodiment shown in FIG. 3, except for operation of a fan drive controller 206. Therefore, detailed description thereof will not be repeated.

In the present embodiment, when running state determining unit 202 determines that vehicle 1 is in the EV running, and intake air temperature determining unit 204 determines that intake air temperature Tair is higher than threshold value Tair(0), fan drive controller 206 opens EGR valve 162 and drives fan 128. The amount of driving of fan 128 is as described in the above-described first embodiment. Therefore, detailed description thereof will not be repeated.

When vehicle 1 is not in the EV driving, or when intake air temperature Tair is lower than or equal to threshold value Tair(0), fan drive controller 206 stops driving of fan 128 and closes EGR valve 162.

Further, the flowchart showing the control structure of the program executed in ECU 200 equipped in vehicle 1 according to the present embodiment is the same as the flowchart shown in FIG. 4 except for the processes of S104 and S106. Therefore, detailed description thereof will not be repeated.

In the present embodiment, in S104, ECU 200 opens EGR valve 162 and drives fan 128. Further, in S106, ECU 200 stops driving of fan 128 and closes EGR valve 162.

Operation of ECU 200 equipped in vehicle 1 according to the present embodiment based on the structure and the flowchart described above will be described.

For example, the case where vehicle 1 is running in the state of operating engine 10 is assumed. ECU 200 stops engine 10 when the predetermined stopping condition of engine 10 is met. Therefore, vehicle 1 runs with use of second MG 30 in the state where engine 10 is stopped (YES in S100). In this stage, when intake air temperature Tair is higher than threshold value Tair(0) (YES in S102), EGR valve 162 is opened, and fan 128 is driven (S104).

Driving of fan 128 causes air to flow as indicated by the arrow of broken line shown in FIG. 7. In other words, the air resided in intake passage 110 flows from EGR piping 166 through communication passage 168 and fan 128 into exhaust passage 122. The air flew into exhaust passage 122 flows into the side of the muffler through catalyst 124. Further, the driving of fan 128 causes the pressure in intake passage 110 to be lowered, so that air is introduced into intake passage 110 through air cleaner 106. Since the driving of fan 128 maintains the ventilated state of the air in intake passage 110, rise in temperature of air in intake passage 110 due to heat of engine 10 is suppressed.

When the predetermined starting condition of engine 10 is met during the EV driving (NO in S100), or when intake air temperature Tair is lower than or equal to threshold value Tair(0) (NO in S102), ECU 200 stops driving of fan 128 and closes EGR valve 162 (S106).

As described above, according to the vehicle of the present embodiment, when vehicle 1 is in the EV running, and intake air temperature Tair is higher than threshold value Tair(0), opening EGR valve 162 and driving of fan 128 can ventilate the air in intake passage 110. Consequently, rise in temperature of air in intake passage 110 due to heat of engine 10 during the EV running can be suppressed. Therefore, a vehicle suppressing lowering in heat efficiency at the time of starting an engine after the EV running can be provided.

<Third Embodiment>

Hereinafter, a vehicle according to the third embodiment will be described. Vehicle 1 according to the present embodiment is different from the configuration of vehicle 1 according to the above-described first embodiment in that ventilation device 140 includes a communication passage 132 in place of communication passage 126, and fan 128 provided on communication passage 132. Other configurations are the same as those of vehicle 1 according to the above-described first embodiment. These configurations have the same reference numerals allotted. Functions of those are also the same. Therefore, detailed description thereof will not be repeated.

Figure 8:
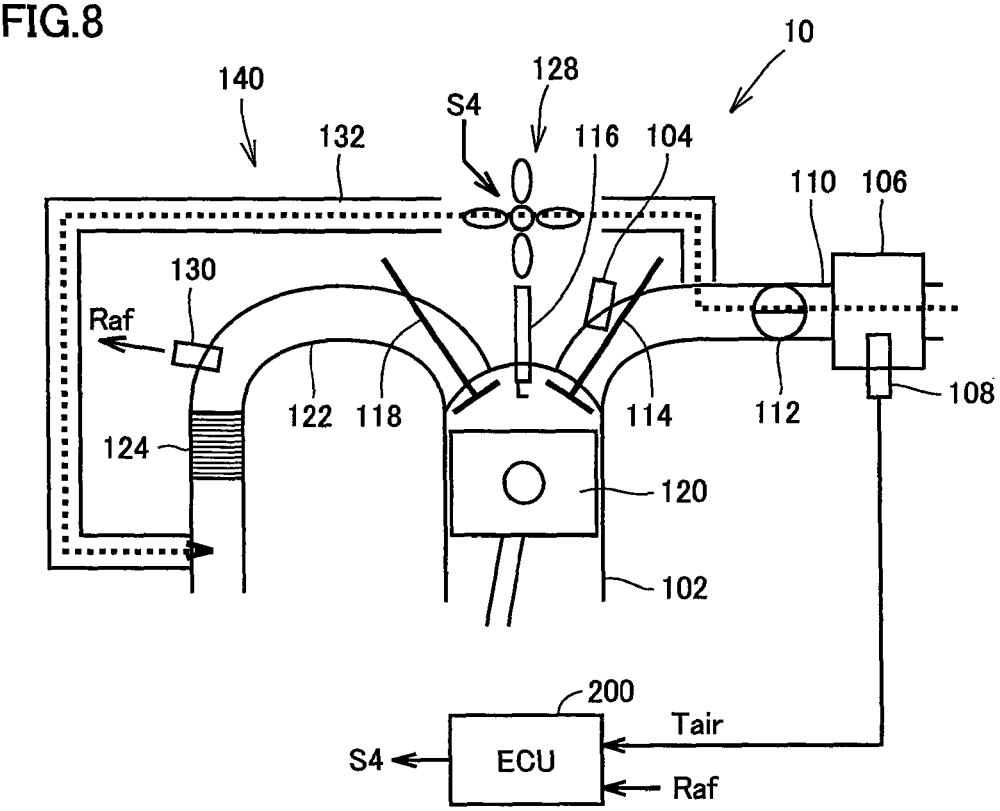
FIG. 8 represents a configuration of a ventilation device equipped in a vehicle according to a third embodiment.

As shown in FIG. 8, communication passage 132 of ventilation device 140 of vehicle 1 according to the present embodiment is different from communication passage 126 of ventilation device 140 provided in vehicle 1 according to the above-described first embodiment in the connection position of communication passage 132 on the side of exhaust passage 122.

Specifically, one end of communication passage 132 is connected to intake passage 110, and the other end of communication passage 132 is connected to a position on a more downstream side (side of muffler) than catalyst 124 on exhaust passage 122 without passing through cylinder 102.

Among the configuration of FIG. 8, the configuration other than those described above are the same as the configuration described in FIG. 1, and functions of those are also the same. These configurations have the same reference numerals allotted. Therefore, detailed description thereof will not be repeated.

The functional block diagram of ECU 200 in the present embodiment is the same as the functional block diagram of ECU 200 shown in FIG. 3 described in the above-described first embodiment. Therefore, detailed description thereof will not be repeated.

Further, the flowchart showing the control structure of the program executed by ECU 200 in the present embodiment is the same as the flowchart shown in FIG. 4 described in the above-described first embodiment. Therefore, detailed description thereof will not be repeated.

Operation of ECU 200 equipped in vehicle 1 according to the present embodiment based on the structure and flowchart as described above will be described.

For example, the case where vehicle 1 is running in the state of operating engine 10 is assumed. ECU 200 stops engine 10 when the predetermined stopping condition of engine 10 is met. Therefore, vehicle 1 runs with use of second MG 30 in the state where engine 10 is stopped (YES in S100).

In this stage, when intake air temperature Tair is higher than threshold value Tair(0) (YES in S102), fan 128 is driven (S104).

Driving of fan 128 causes the air to flow as indicated by the arrow of broken line in FIG. 8. In other words, the air resided in intake passage 110 flows to a position on a more downstream side than catalyst 124 on exhaust passage 122 through communication passage 132. The air flew from communication passage 132 to exhaust passage 122 flows into the side of muffler. Further, since driving of fan 128 lowers the pressure in intake passage 110, the air is introduced into intake passage 110 through air cleaner 106. Since driving of fan 128 maintains the ventilated state of the air in intake passage 110, rise in temperature of air in intake passage 110 due to heat of engine 10 can be suppressed.

Further, when the predetermined starting condition of engine 10 is met during the EV running (NO in S100), or when intake air temperature Tair is lower than or equal to threshold value Tair(0) (NO in S102), ECU 200 stops driving of fan 128 (S106).

As described above, according to the vehicle of the present embodiment, when vehicle 1 is in the EV running, and intake air temperature Tair is higher than threshold value Tair(0), driving of fan 128 can ventilate air in intake passage 110. Consequently, rise in temperature of air in intake passage 110 due to heat of engine 10 during the EV running can be suppressed. Therefore, a vehicle suppressing lowering in heat efficiency at the time of starting engine after EV running can be provided.

Further, since the air can flow from communication passage 132 to the downstream side of catalyst 124 on exhaust passage 122, lowering in temperature of catalyst 124 can be suppressed. Consequently, lowering in purifying performance of catalyst 124 can be suppressed.

<Fourth Embodiment>

In the following, a vehicle according to the fourth embodiment will be described. Vehicle 1 according to the present embodiment is different from the configuration of vehicle 1 according to the above-described first embodiment in that ventilation device 140 includes a check valve 136, a communication passage 134 in place of communication passage 126, and fan 128 provided on communication passage 134. The configuration other than the above is the same configuration as the configuration of vehicle 1 according to the above-described first embodiment. These configurations have the same reference numerals allotted. Functions of those are also the same. Therefore, the detailed description of those will not be repeated.

Figure 9:
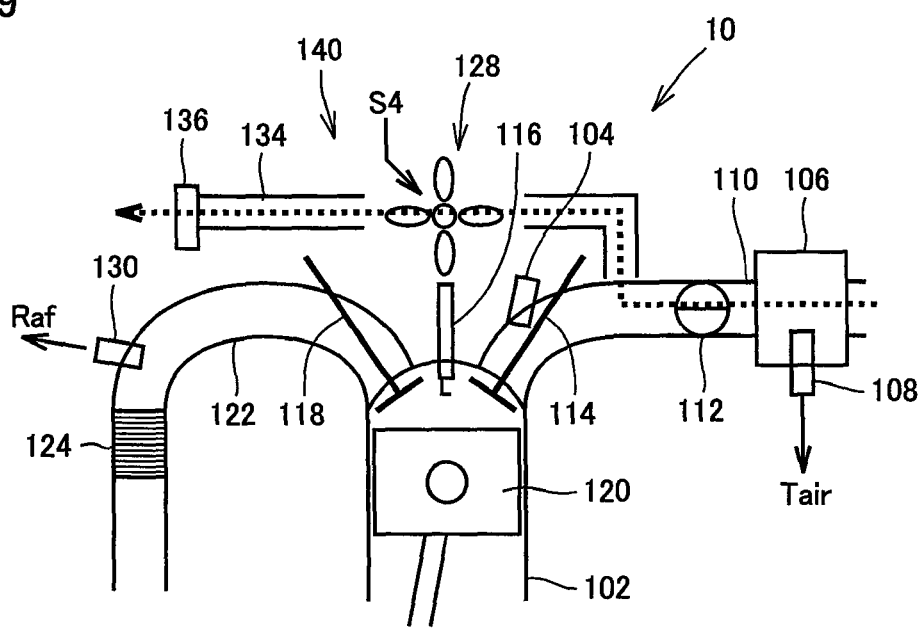
FIG. 9 represents a configuration of a ventilation device equipped in a vehicle according to a fourth embodiment.

As shown in FIG. 9, communication passage 134 of ventilation device 140 of vehicle 1 according to the present embodiment is different from communication passage 126 of ventilation device 140 provided in vehicle 1 according to the above-described first embodiment in that the end of communication passage 134 is open into the engine room through check valve 136.

Specifically, one end of communication passage 134 is connected to intake passage 110, and the other end of communication passage 134 is open to an exterior space of engine 10 (in other words, engine room) through check valve 136. Check valve 136 allows flow of gas from communication passage 134 into the engine room and blocks flow of gas from the engine room to communication passage 134.

Among the configuration of FIG. 9, the configuration other than the configuration described above is the same as the configuration described with reference to FIG. 1, and functions of those are also the same. Those configurations have the same reference numerals allotted. Therefore, detailed description thereof will not be repeated.

The functional block diagram of ECU 200 in the present embodiment is the same as the functional block diagram of ECU 200 shown in FIG. 3 described in the above-described first embodiment. Therefore, detailed description thereof will not be repeated.

Further, the flowchart showing the control structure of the program executed in ECU 200 according to the present embodiment is the same as the flowchart shown in FIG. 4 described in the above-described first embodiment. Therefore, detailed description thereof will not be repeated.

Operation of ECU 200 provided in vehicle 1 according to the present embodiment based on the structure and flowchart as described above will be described.

For example, the case where vehicle 1 is running in the state of operating engine 10 is assumed. ECU 200 stops engine 10 when the predetermined stopping condition of engine 10 is met. Therefore, vehicle 1 runs with use of second MG 30 in the state where engine 10 is stopped (YES in S100).

In this stage, when intake air temperature Tair is higher than threshold value Tair(0) (YES in S102), fan 128 is driven (S104).

Driving of fan 128 causes air to flow as indicated by the arrow of the broken line in FIG. 9. In other words, air resided in intake passage 110 flows through communication passage 134, fan 128, and check valve 136 into the engine room outside of engine 10. Further, since driving of fan 128 lowers the pressure in intake passage 110, air is introduced into intake passage 110 through air cleaner 106. Since driving of fan 128 maintains the ventilated state of the air in intake passage 110, rise in temperature of hair in intake passage 110 due to heat of engine 10 is suppressed.

When the predetermined starting condition of engine 10 is met during the EV running (NO in S100), or when intake air temperature Tair is lower than or equal to threshold value Tair(0) (NO in S102), ECU 200 stops driving of fan 128 (S106).

As described above, according to the vehicle of the present embodiment, when vehicle 1 is in the EV driving, and intake air temperature Tair is higher than threshold value Tair(0), driving of fan 128 can ventilate air in intake passage 110. Consequently, rise in temperature of air in intake passage 110 due to heat during the EV running can be suppressed. Therefore, a vehicle suppressing lowering of heat efficiency at the time of starting the engine after the EV driving can be provided.

Further, since the air in intake passage 110 can flow into the engine room through communication passage 134 without flowing through exhaust passage 122, lowering in the temperature of catalyst 124 can be suppressed. Consequently, lowering in the cleaning performance of catalyst 124 can be suppressed.

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

Reference Signs List 1 vehicle; 10 engine; 11 engine rotational speed sensor; 12 first resolver; 13 second resolver; 14 wheel speed sensor; 16 drive shaft; 20 first MG; 22 clutch; 30 second MG; 40 power split device; 42 motive power transmission device; 50 sun gear; 52 pinion gear; 54 carrier; 56 ring gear; 58 reducer; 60 PCU; 70 battery; 80 drive wheels; 102 cylinder; 104 fuel injection device; 106 air cleaner; 108 intake air temperature sensor; 110 intake passage; 112 throttle valve; 114 intake valve; 116 ignition plug; 118 exhaust valve; 120 piston; 122 exhaust passage; 124 catalyst; 126, 132, 134, 168 communication passage; 128 fan; 130 air-fuel ratio sensor; 136 check valve; 140 ventilation device; 142 exhaust re-circulating device; 150 start switch; 151 braking device; 152 brake actuator; 154 disc brake; 156 battery temperature sensor; 158 current sensor; 160 voltage sensor; 162 EGR valve; 164 EGR cooler; 166 EGR piping; 200 ECU; 202 running state determining unit; 204 intake air temperature determining unit; 206 fan drive controller.

The invention claim is:

1. A vehicle, comprising:
   a rotating electrical machine for driving equipped in the vehicle;
   an internal combustion engine;
   a ventilation device to perform a ventilation operation, said ventilation device including a communication passage having one end connected to an intake passage of said internal combustion engine; and
   a controller configured to control said vehicle to perform a ventilation operation of ventilating air in said intake passage of said internal combustion engine when said vehicle runs with use of said rotating electrical machine for driving, and when temperature in said intake passage of said internal combustion engine is higher than a threshold value even though said internal combustion engine is in a stopped state,
   wherein another end of said communication passage is connected to an exhaust passage of said internal combustion engine without intervention of a cylinder of said internal combustion engine.

2. The vehicle according to claim 1, wherein said other end of said communication passage is connected to a more upstream position on said exhaust passage than a catalyst provided on said exhaust passage.

3. The vehicle according to claim 1, wherein said other end of said communication passage is connected to a more downstream position on said exhaust passage than a catalyst provided on said exhaust passage.

4. The vehicle according to claim 1, wherein said ventilation device further includes a fan for allowing air to flow from said intake passage to said communication passage.

5. The vehicle according to claim 4, wherein said vehicle further comprises a detector for detecting said temperature in said intake passage, and
   said controller drives said fan when said temperature in said intake passage detected by said detector is higher than the threshold value.

6. A vehicle, comprising:
   a rotating electrical machine for driving equipped in the vehicle;
   an internal combustion engine;
   a ventilation device to perform a ventilation operation, said ventilation device including a communication passage having one end connected to an intake passage of said internal combustion engine; and
   a controller configured to control said vehicle to perform a ventilation operation of ventilating air in said intake passage of said internal combustion engine when said vehicle runs with use of said rotating electrical machine for driving, and when temperature in said intake passage of said internal combustion engine is higher than a threshold value even though said internal combustion engine is in a stopped state,
   wherein another end of said communication passage is configured to be open into an engine room of said vehicle.

7. The vehicle according to claim 6, wherein said ventilation device further includes a fan for allowing air to flow from said intake passage to said communication passage.

8. The vehicle according to claim 7, wherein said vehicle further comprises a detector for detecting said temperature in said intake passage, and said controller drives said fan when said temperature in said intake passage detected by said detector is higher than the threshold value.

9. A vehicle, comprising:
a rotating electrical machine for driving equipped in the vehicle;
an internal combustion engine;
a ventilation device to perform a ventilation operation, said ventilation device including a communication passage having one end connected to an intake passage of said internal combustion engine; and
a controller configured to control said vehicle to perform a ventilation operation of ventilating air in said intake passage of said internal combustion engine when said vehicle runs with use of said rotating electrical machine for driving, and when temperature in said intake passage of said internal combustion engine is higher than a threshold value even though said internal combustion engine is in a stopped state,
wherein said ventilation device is provided in an exhaust re-circulating device.

10. The vehicle according to claim 9, wherein said ventilation device further includes a fan for allowing air to flow from said intake passage to said communication passage.

11. The vehicle according to claim 10, wherein said vehicle further comprises a detector for detecting said temperature in said intake passage, and
said controller drives said fan when said temperature in said intake passage detected by said detector is higher than the threshold value.

* * * * *